Dec. 4, 1956  T. D. FOSTER  2,772,709
AUTOMATIC MORTISING AND TENONING MACHINE
Filed Aug. 15, 1952  11 Sheets-Sheet 6

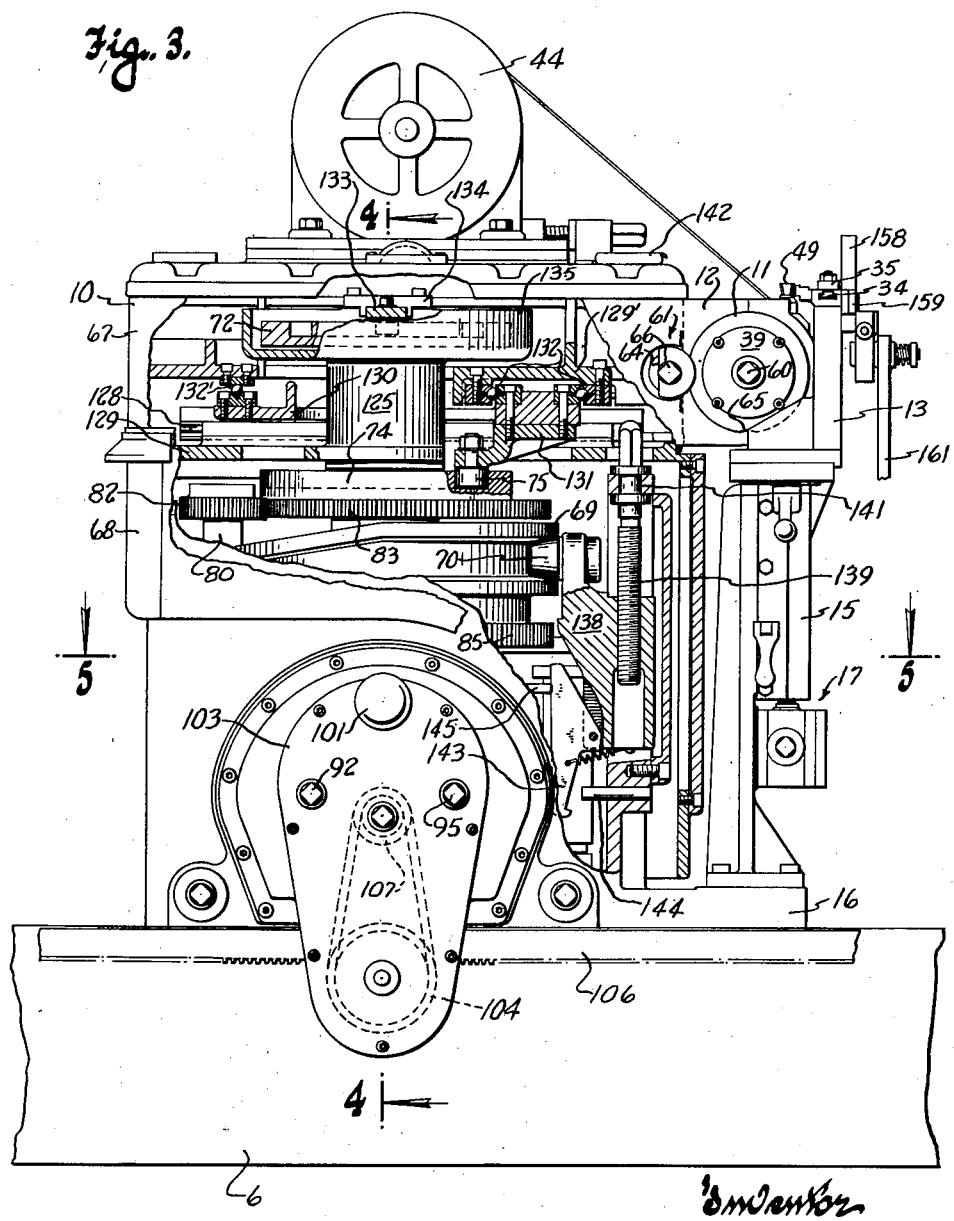

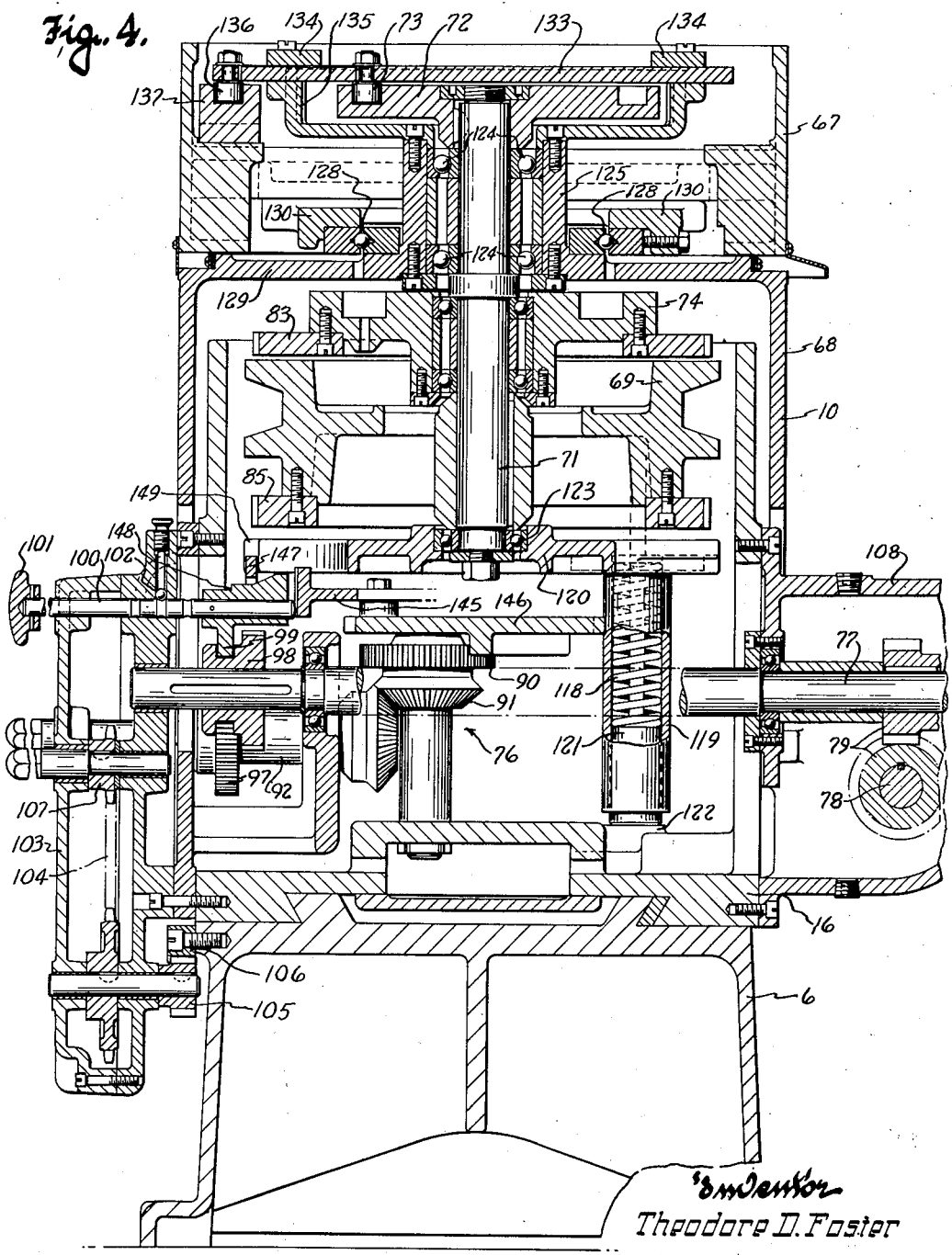

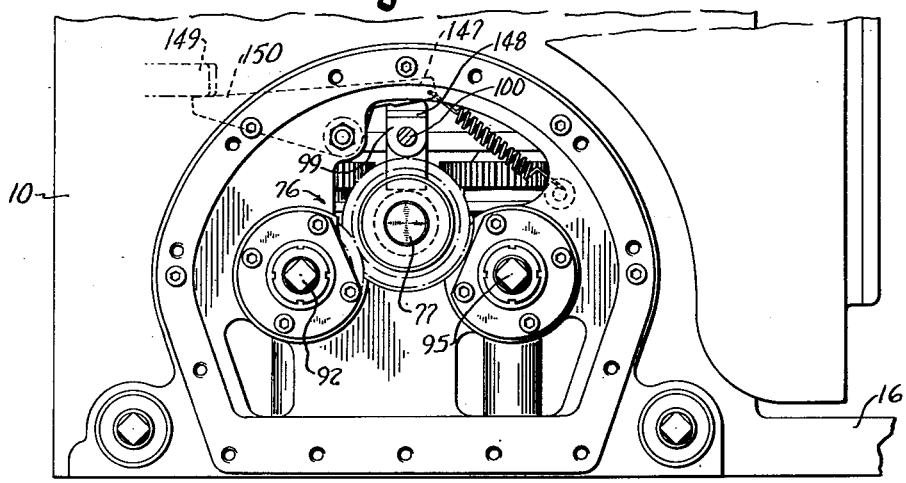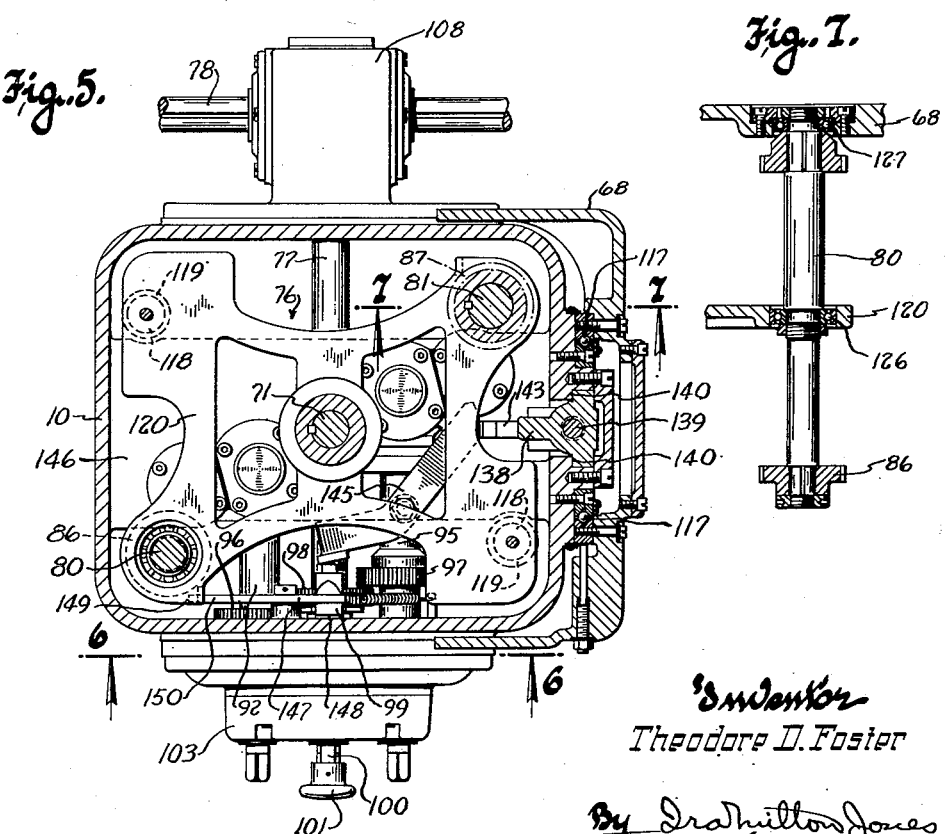

Inventor
Theodore D. Foster
By Ira Milton Jones
Attorney

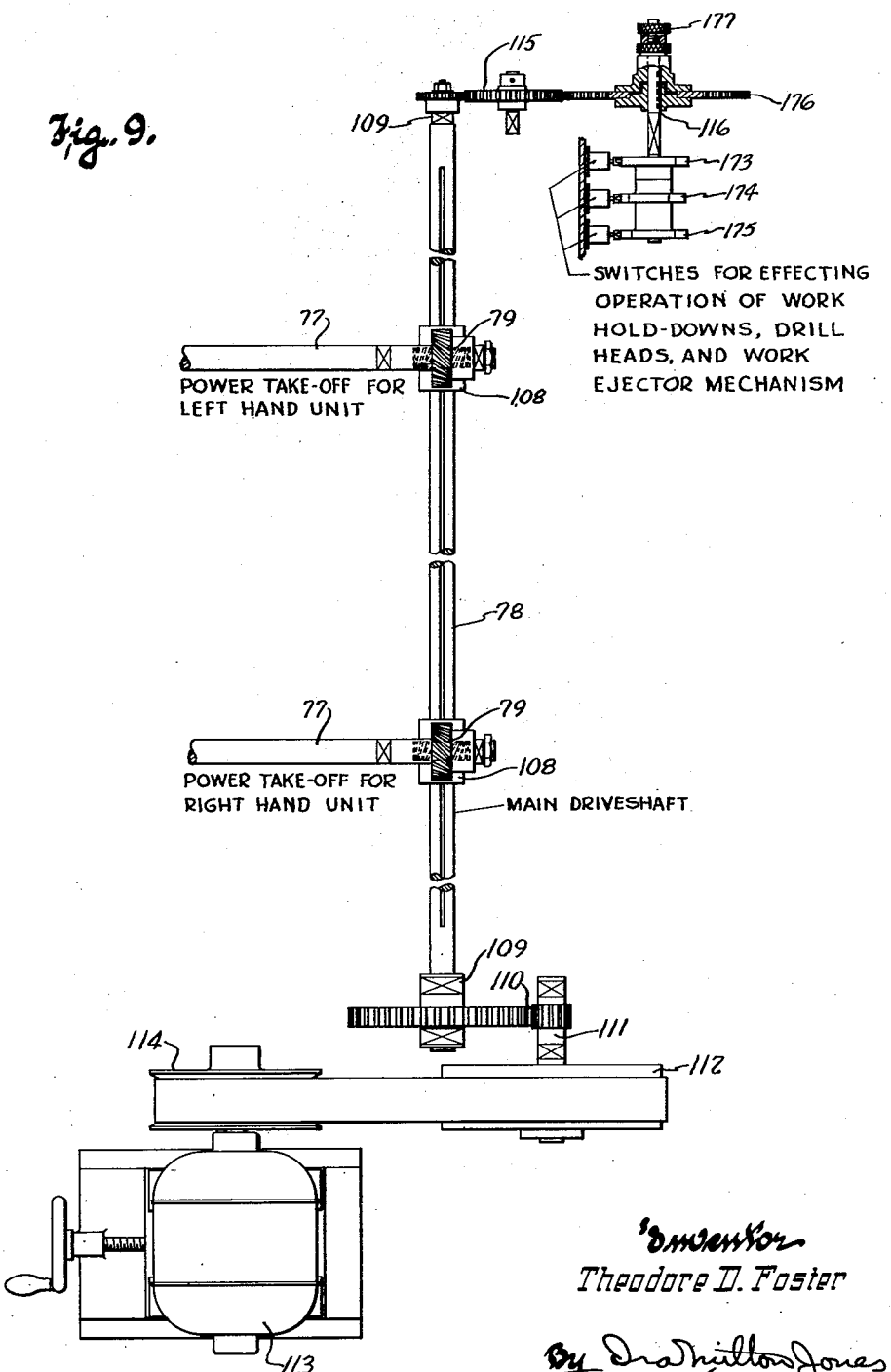

Dec. 4, 1956     T. D. FOSTER     2,772,709
AUTOMATIC MORTISING AND TENONING MACHINE
Filed Aug. 15, 1952     11 Sheets-Sheet 8
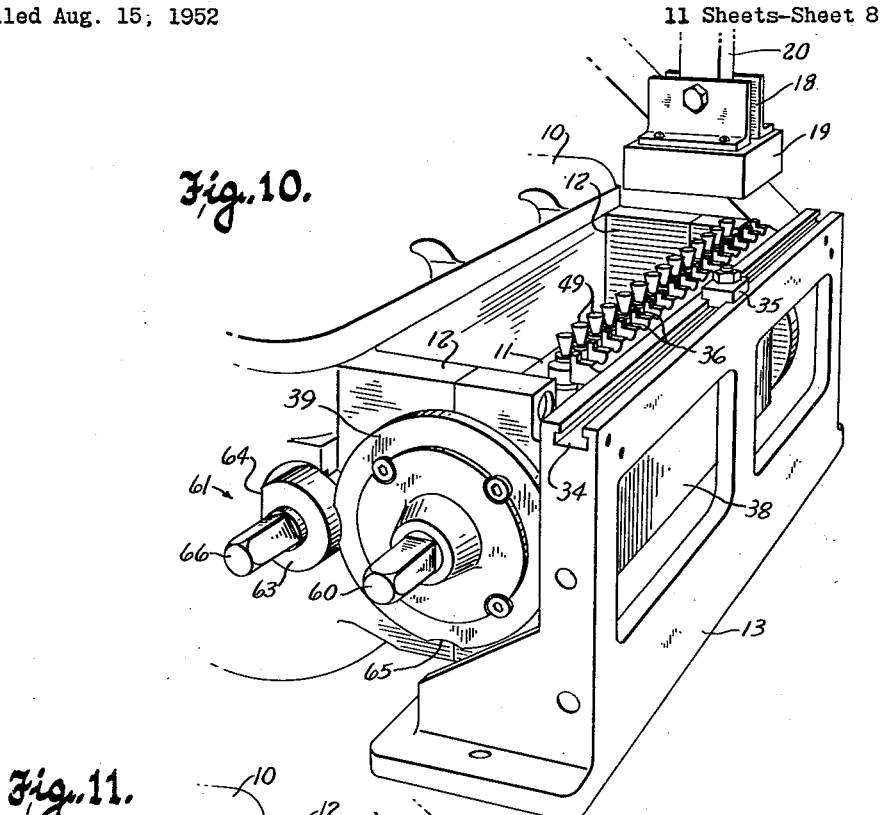
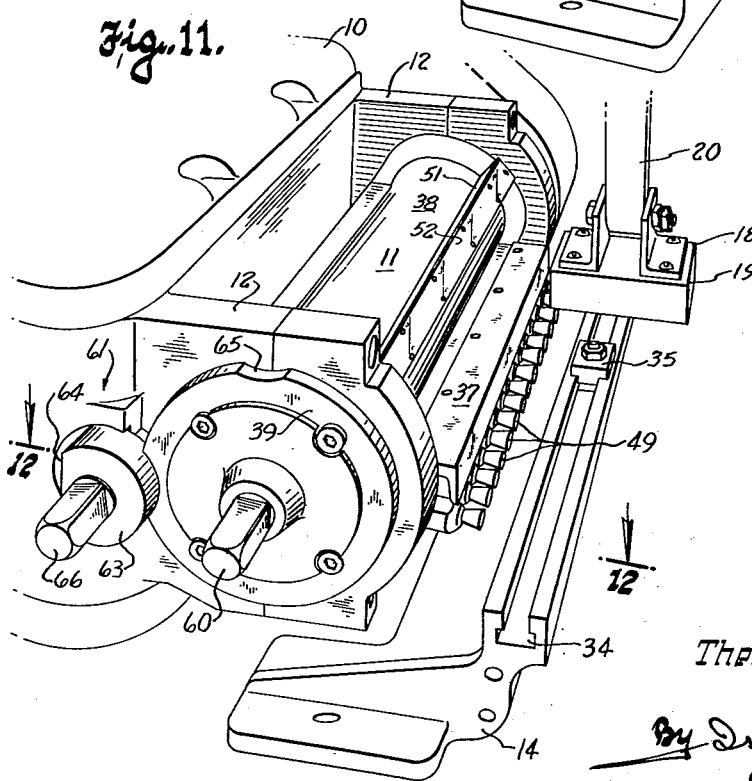
Theodore D. Foster
By Ira Milton Jones
Attorney Dec. 4, 1956      T. D. FOSTER      2,772,709
AUTOMATIC MORTISING AND TENONING MACHINE
Filed Aug. 15, 1952      11 Sheets-Sheet 9

Inventor
Theodore D. Foster
By Ira Milton Jones
Attorney

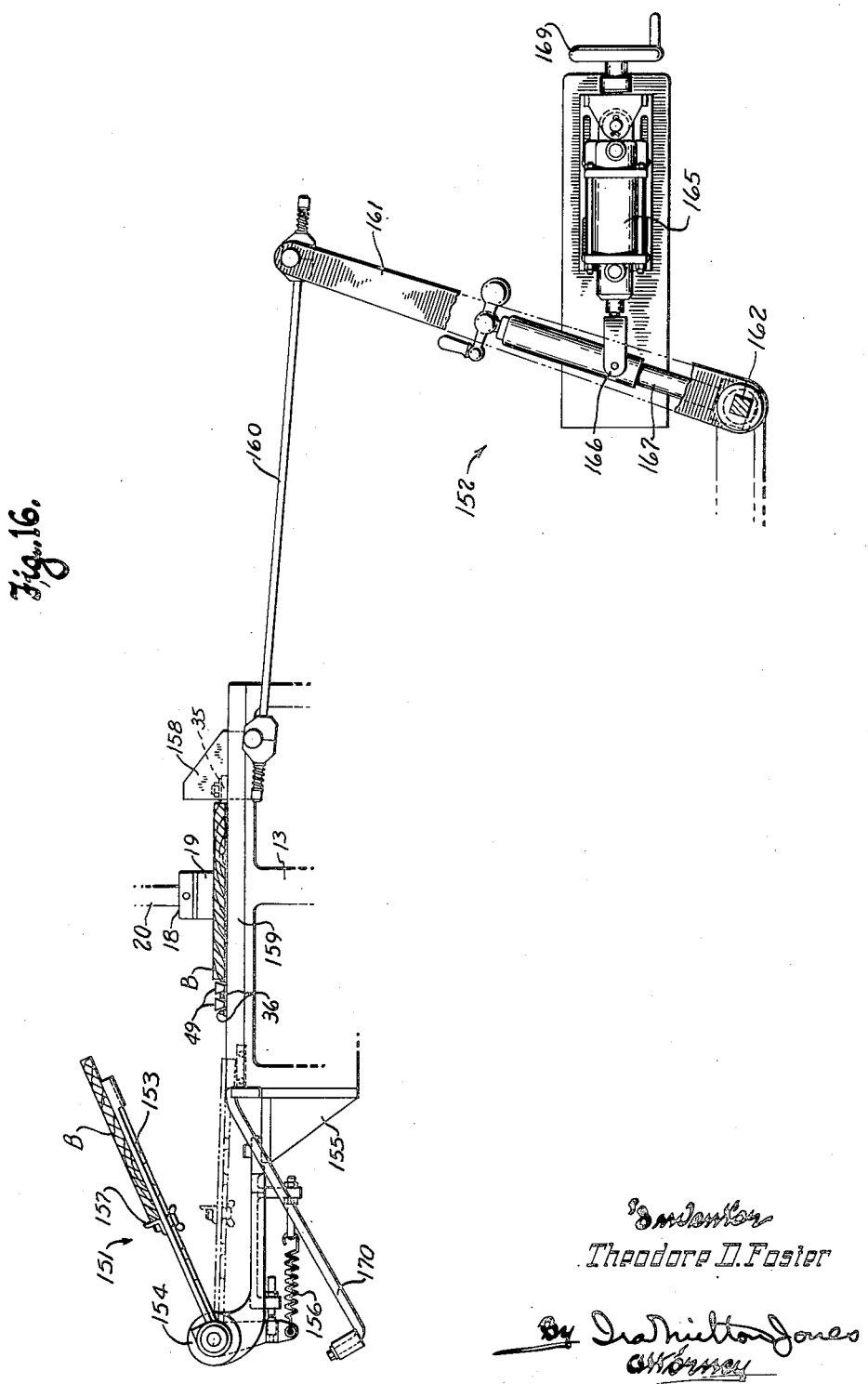

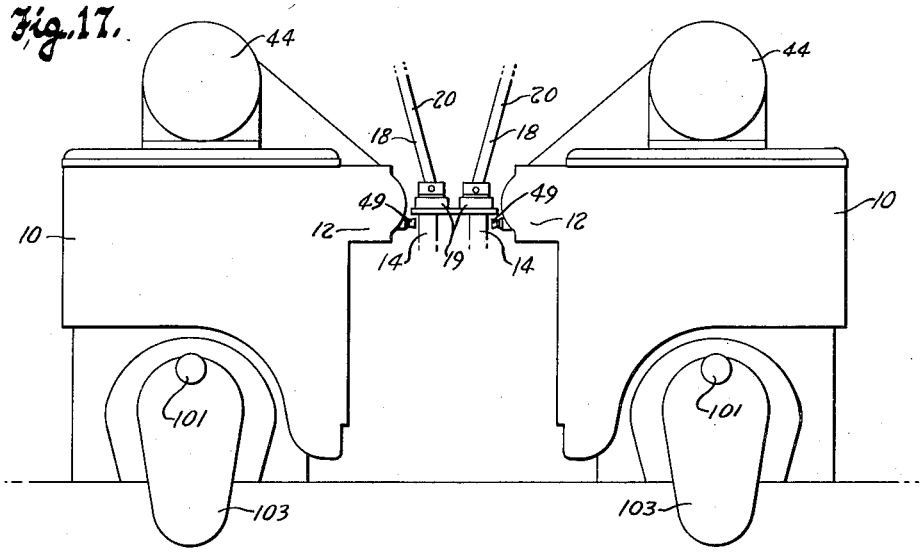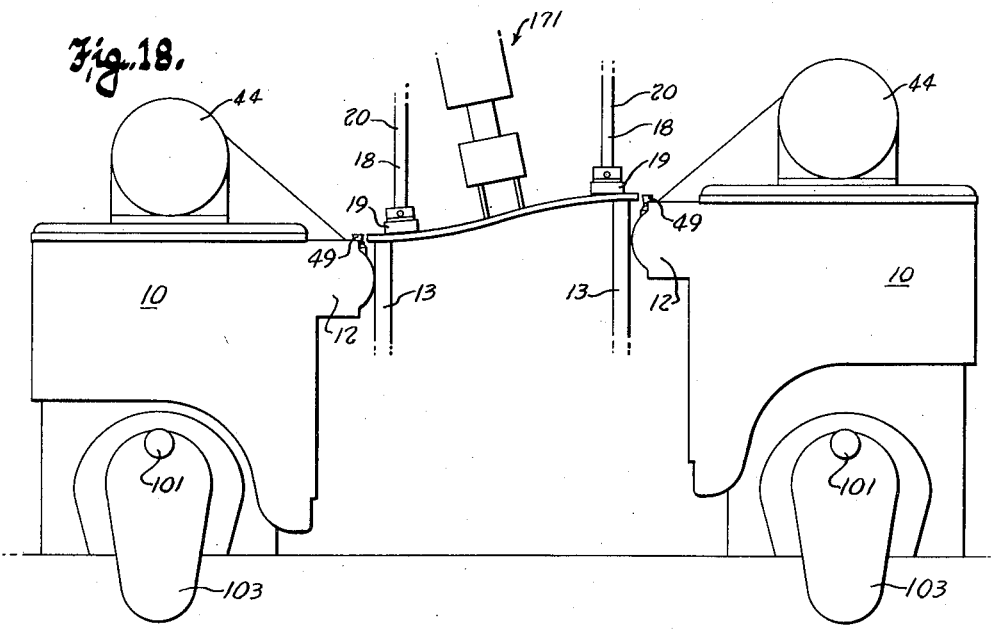

United States Patent Office 2,772,709
Patented Dec. 4, 1956

2,772,709

AUTOMATIC MORTISING AND TENONING MACHINE

Theodore David Foster, Cincinnati, Ohio, assignor to The Bell Machine Company, Oshkosh, Wis., a corporation of Wisconsin Application August 15, 1952, Serial No. 304,503

21 Claims. (Cl. 144—87)

This invention relates to automatic mortising and tenoning machines of the type forming the subject matter of Patent No. 2,586,798, issued February 26, 1952, and has as its general purpose to improve the machine of that patent.

As in the aforesaid patent, the machine of this invention when set for mortising simultaneously cuts mortises into the opposite ends of drawer fronts or backs, and when set for tenoning simultaneously forms tenons on the opposite ends of both drawer sides at the same time. The mortising and tenoning are both performed by the same cutter head, but two such heads are provided, a right hand head operating on one end of the work and a left hand head operating on the other end of the work.

Each cutter head has a gang of cutters constrained to rotate on parallel axes lying in a common plane, and each cutter head is mounted for adjustment between a mortise cutting position at which its cutters stand upright and a tenon cutting position at which the common plane containing the cutter axes is disposed horizontally. For the mortise cutting operation the cutter heads are merely moved horizontally toward and from each other to carry the cutters into and out of the ends of the work a predetermined distance, it being understood that the work is supported at the proper elevation for the cutters to act thereon. For tenon cutting, the work is again held in a fixed position at the proper elevation while the cutter heads are moved with an orbital motion to pass the cutters twice through the ends of the work with each cutter describing an oval and moving around and shaping a pair of back-to-back tenons.

The work is held in proper position for either mortising or tenoning by work supports disposed at the proper elevation and hold-downs coacting therewith, the hold-downs being pneumatically actuated, and one of the features of the invention resides in the fact that two work supports of appropriately different heights are provided for each cutter head, one for mortise cutting and the other for tenon cutting, and that these work supports are quickly and easily interchanged.

To achieve maximum production the operation of the hold-downs as well as the motion of the cutter heads is performed automatically and one of the objects of this invention is to achieve proper synchronism between the operation of the hold-downs and the functioning of the cutter heads. To this end a single main drive shaft provides the power for simultaneously producing the different motions of both cutter heads and also controls the timing of the instrumentalities which govern the operation of the hold-downs.

For maximum production it is also desirable to employ automatic ejector means for ejecting the work as soon as the mortising or tenoning operation is completed and to this end the present invention provides a novel pneumatically powered ejector and a control therefor, which, like the hold-downs, is governed by the main drive shaft so as to be properly timed with the rest of the machine.

The machine of this invention in addition to cutting the mortises and tenons is also adapted to drill hardware or handle holes in the drawer fronts, and to maintain the desired synchronism, the operation of the drill heads is governed by control instrumentalities also driven from the main drive shaft.

To enable setting up the machine for a given job the timing of the operation of the hold-downs, drill heads and ejector mechanism with respect to the functioning of the cutter heads is adjustable and to this end the control instrumentalities for the hold-downs, drill heads and ejector mechanism include timing cams drivingly connectible with the main drive shaft in any desired position. Thus, after the timing cams have been adjusted to have the hold-downs, drill heads and ejector mechanism operate in proper timed relation to the functioning of the cutter heads, the speed at which the machine is operated may be varied at will without disturbing the pre-set coordination between the various functions, by simply varying the speed at which the main drive shaft is driven.

With a view toward simplicity of design and construction each cutter head is carried by a machine unit complete in itself, the two machine units being arranged right and left hand and mounted for bodily adjustment toward and from each other upon the bed of the main frame of the machine. Each machine unit incorporates within itself all the mechanism necessary to import the required motion of its cutter head, and in addition, carries its own work support; and one of the features of the invention resides in the fact that the changeover from mortise cutting to tenon cutting, and vice versa, is simply and quickly effected by merely rotating the cutter heads about their longitudinal axes through ninety degrees, replacing one work support by the other, and shifting the gears of the transmission mechanism through which the rotation of the main drive shaft is translated into either mortise cutting or tenon cutting movements of the cutter heads.

Another feature of this invention resides in the fact that very short work is accommodated without necessitating removal and interchanging of cutter heads as was necessary in the machine of the aforesaid patent.

Since the work supports for the opposite ends of the work are carried by the machine units and therefore at all times are in proper positional relationship with respect to the cutter heads, the adjustment of the machine for different lengths of stock requires merely sliding the machine units toward or from each other along the bed of the main frame.

A correspondingly simple adjustment adapts the machine to the cutting of mortises in the ends of so-called "half-swell" drawer fronts wherein the mortises at one end of the drawer front must be cut at an elevation above that at which the mortises at the other end of the drawer front are cut. To this end the invention provides simple means for vertically adjusting the cutter head carrying structure of the two machine units to enable locating the cutter heads thereof at any position of elevation within the range of the machine.

With a further view toward achieving maximum production this invention has as another of its objects to provide a novel ejector mechanism for ejecting the finished work and a novel feed table upon which the stock is placed preparatory to being moved into proper position.

One of the problems encountered in the machine of the aforesaid patent concerned the lubrication of the gears driving the individual cutters of the cutter heads, and it is, therefore, another object of this invention to provide an improved lubrication system for the cutter heads which utilizes the fog-type of lubrication in a novel manner to assure proper lubrication of all moving parts of the cutter head.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a front view of the left hand unit of the machine with parts thereof broken away and in section;

Figure 4 is a vertical cross sectional view through Figure 3 on the plane of the line 4—4;

Figure 5 is a horizontal sectional view through Figure 3 on the plane of the line 5—5;

Figure 6 is a front view of the lower portion of the left hand unit of the machine taken essentially on the plane of the line 6—6 in Figure 5;

Figure 7 is a fragmentary detail sectional view through Figure 5 on the plane of the line 7—7;

Figure 9 is a diagrammatic plan view of the drive for the entire machine and the mechanism for synchronizing the operation of the hold-down, drill heads and work ejector with the functioning of the cutter heads, and illustrating how it is possible once the machine has been synchronized to vary its speed of operation without loss of synchronism;

Figure 10 is a perspective view of the cutter head of the left hand unit of the machine in its mortise cutting position of adjustment with the mortise cutting work support in position, the feed table and ejector being omitted for clarity;

Figure 11 is a view similar to Figure 10 but showing the cutter head in its tenon cutting position and showing the tenon cutting work support in position;

Figure 16 is a cross sectional view through the center of the machine but illustrating only the work ejector and the feed table;

Figure 1:
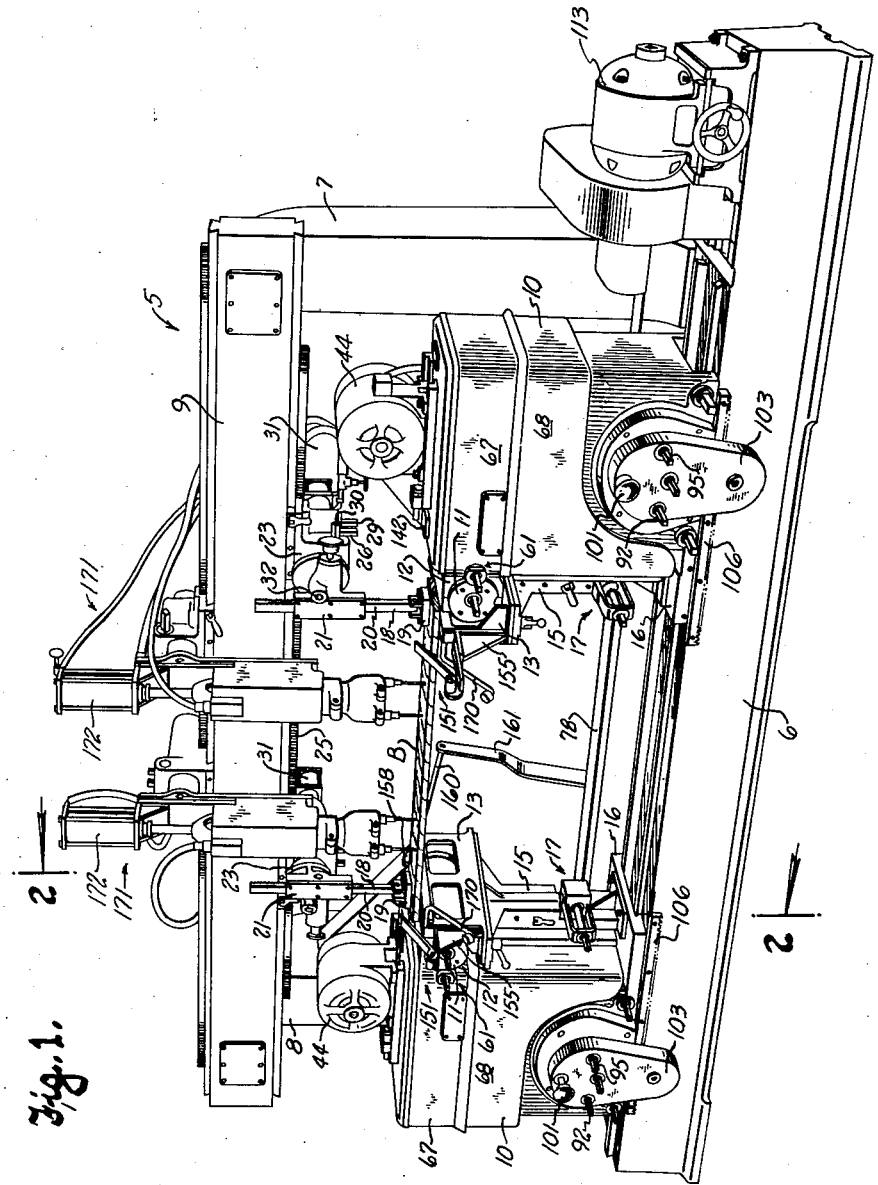
Figure 1 is a perspective view of the entire machine viewing the same from the operator's position or front of the machine.
Figure 2:
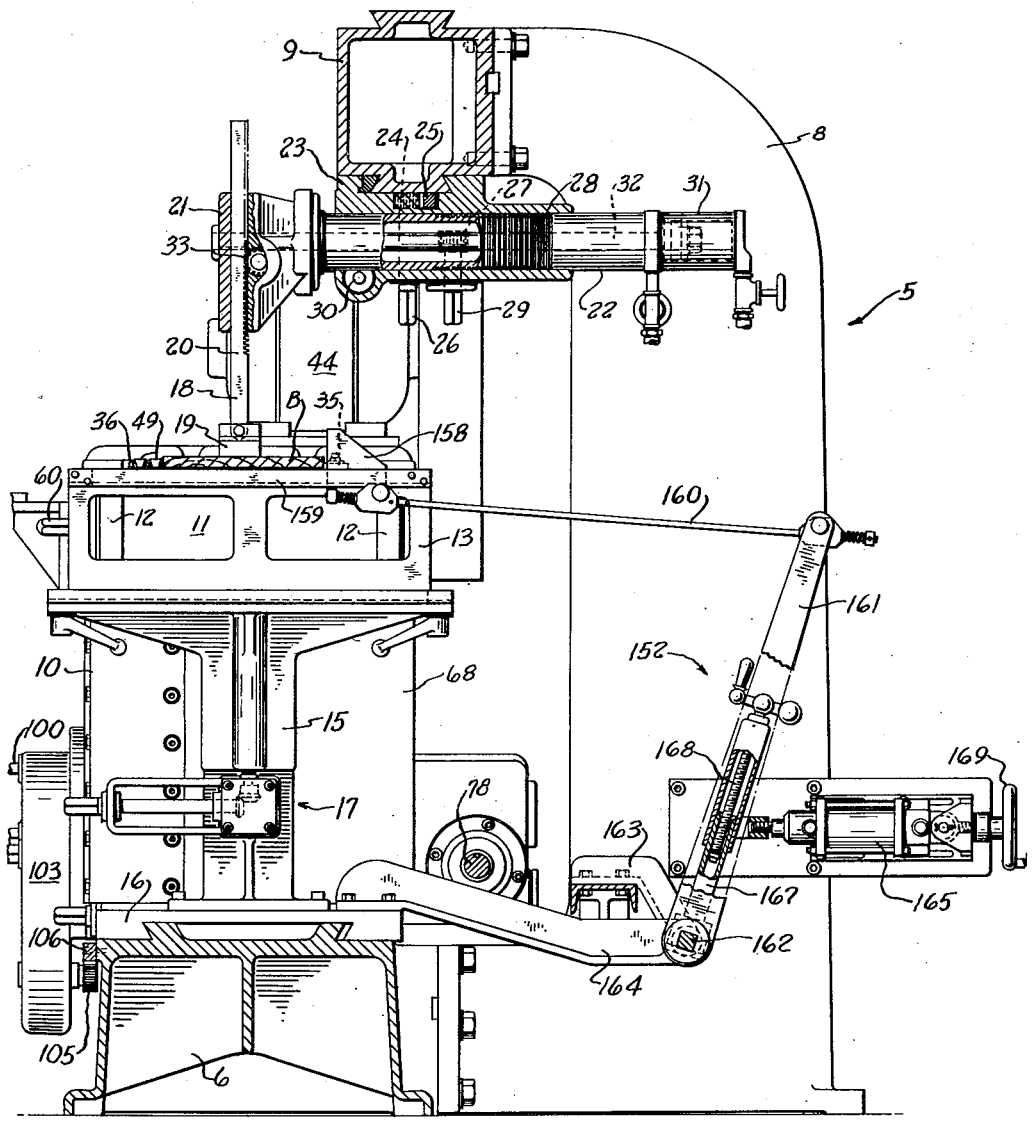
Figure 2 is a cross sectional view through Figure 1 on the plane of the line 2—2.
Figure 8:
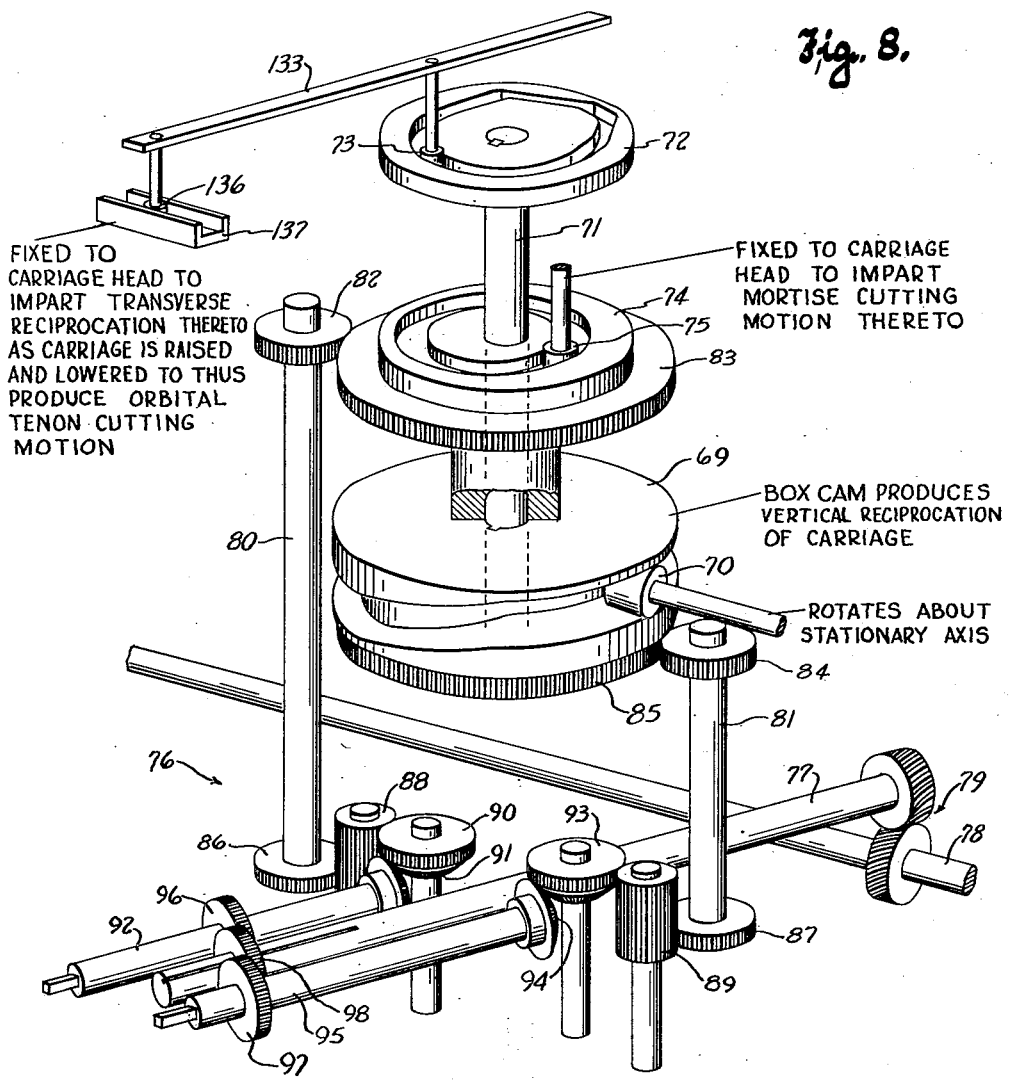
Figure 8 is a diagrammatic view in perspective of the transmission mechanism of one of the units of the machine through which rotation of the main drive shaft is translated into the horizontal mortise cutting reciprocation of the cutter head or into the orbital tenon cutting motion of the cutter head.

Figure 17 is a diagrammatic front view of the left and right hand units of the machine illustrating the adaptability of the machine to short work; and Figure 18 is a view similar to Figure 17 but illustrating the adaptation of the machine to work such as "half-swell" drawer fronts where the mortising at one end of the stock must be performed at an elevation above that at which the mortising is done upon the other end of the stock.

Referring now particularly to the accompanying drawings in which like numerals indicate like parts throughout the several views, the numeral 5 designates the main frame of the machine and which comprises a bed 6 and two upright pedestals 7 and 8 connected by a bridge 9. The bed 6 has two machine units 10 slidably mounted thereon for movement toward and from each other. These two machine units are identical except that they are arranged right hand and left hand and in the drawings where only one unit is shown it is always the left hand unit.

Each machine unit has an elongated cutter head 11 which is generally similar to the cutter heads of the aforesaid Patent No. 2,586,798 in that it includes a gang of individual cutters constrained to rotate on parallel axes which lie in a common plane parallel to but spaced from the longitudinal axis of the cutter head. The cutter heads like the machine units are right and left hand and each is journalled in a pair of axially aligned bearings 12 for ninety degrees of rotation between a mortise cutting position (see Figure 10) in which the cutter axes are vertical and the common plane containing them lies outwardly of the longitudinal axis of the cutter head, and a tenon cutting position (see Figure 11) in which the common plane containing the axes of the cutters is horizontal and beneath the longitudinal axis of the cutter head.

Such rotational adjustment of the cutter heads, of course, changes the elevation at which the cutters operate, thus requiring the work to be supported at different elevations for the two operations. To this end two interchangeable work supports 13 and 14 are provided for each machine unit, the former being much higher than the latter. These work supports are interchangeably securable to a post structure 15 secured to and extending up from the base 16 of the machine unit.

To accommodate different thicknesses of work and to enable accurate adjustment of the elevation of the work with respect to the cutters the post structures 15 are vertically adjustable by screw jack arrangements illustrated generally by the numeral 17.

Hold-downs 18 coact with the work supports in position to firmly hold the work while the cutter heads perform their cutting operation thereon. These hold-downs are mounted on the bridge 9 for adjustment lengthwise thereof to enable the same to be properly positioned above the work supports and in addition may be raised and lowered to coordinate their elevation with the height of the work support in use.

Moreover, the mounting for the hold-downs also permits them to be swung angularly to enable the same to be brought close together as shown in Figure 17 which illustrates the adaptation of the machine to very short work.

*The hold-downs*

Each hold-down comprises a foot 19 mounted on the lower end of a rack bar 20 which is slidable in a head 21 on the front end of a supporting tube 22. The tube 22 is rotatable and axially slidable in a cross head 23 which in turn is slidably supported from the underside of the bridge 9 for adjustment lengthwise of the bridge. A pinion 24 journalled in the cross head and meshing with a rack 25 fixed to the underside of the bridge provides means for adjusting the cross head along the length of the bridge, the pinion 24 being rotatable by a crank (not shown) applied to the squared end 26 of the pinion shaft.

Longitudinal adjustment of the tube 22 is accomplished in a similar manner by turning a pinion 27 which meshes with rack teeth 28 cut around the circumference of the tube 22, rotation being imparted to the pinion 27 by a crank (not shown) applied to the squared end 29 of the pinion shaft. It will be evident that this manner of adjusting the tube 22 permits it to be rotated to swing the hold-down to and from a normal vertical position. After the tube 22 has been adjusted to its desired position it may be locked against accidental displacement by suitable locking means as, for instance, a clamping screw 30.

Longitudinal movement is imparted to the rack bar 20 by an air cylinder 31 mounted on the rear end of the tube 22. The piston of this air cylinder is connected to a rack bar 32 which extends axially through the tube 22 and meshes with a wide pinion 33 rotatable in the head 21 and also meshing with the rack bar 20. The stroke of the air cylinder piston is always the same so that the range of up and down movement of the hold-down is fixed. However, the location of this range is adjustable by simply withdrawing the wide pinion 33 from mesh with the rack bar 20, shifting the rack bar up or down as required and re-engaging the pinion therewith.

The work supports

The work supports 13 and 14 are similar in construction but are of different height. Each has a T-slot 34 in the top thereof to slidably mount a stop 35 and enable the same to be clamped in any desired position along the length of the support. When properly set these stops engage the rear edge of the work placed upon the supports and square the same in relation to the cutter heads.

Proper endwise placement of the work during mortise cutting is defined by abutments 36 on the work supports 13 with which the ends of the work are engaged. These abutments are aligned lengthwise of the work supports and lie between the paths of the cutters as they move in and out to effect mortise cutting. During tenon cutting proper endwise placement of the work is defined by guide rails 37 fixed to the cutter heads.

The cutter heads

The cutter heads 11, as noted hereinbefore, are identical except that they are right and left hand. Each comprises an elongated hollow body 38 having cylindrical ends 39 journalled in the bearings 12. Within the hollow body 38 and extending lengthwise thereof is a rotatable drive shaft 40 upon which miter gears 41 are fixed. One end of the drive shaft protrudes from the adjacent end of the cutter head body to mount a pulley 42 which is drivingly connected through belts 43 with a drive motor 44.

Figure 12:
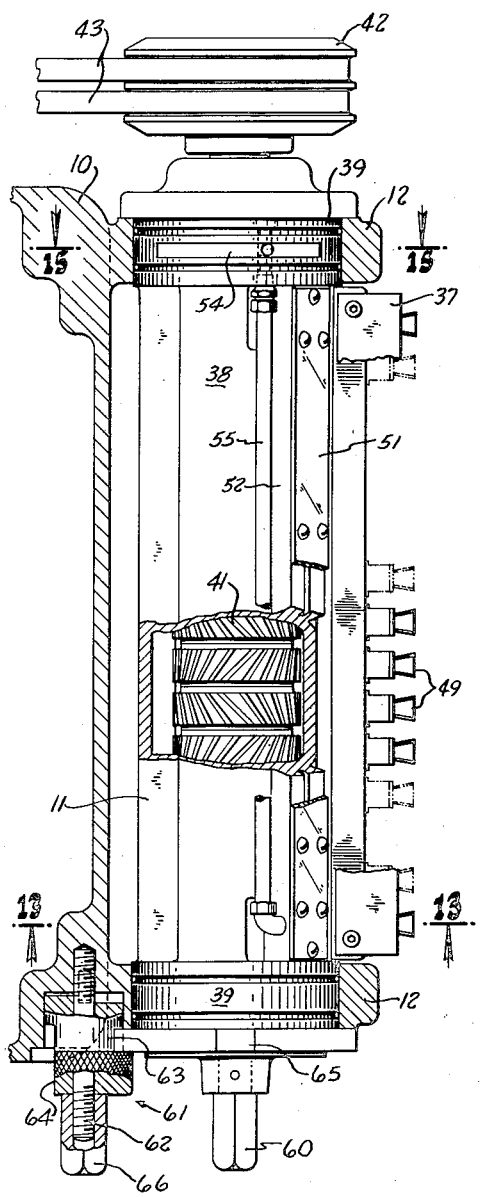
Figure 12 is a longitudinal sectional view through the left hand cutter head taken essentially on the plane of the line 12—12 in Figure 11 with parts thereof broken away and in section to illustrate structural details, said view showing particularly the manner in which the gearing for the cutter head is lubricated.

At one side of the longitudinal axis of the cutter head which is also the axis of the shaft 40 the body 38 is shaped to provide a well 45 extending lengthwise of the body and substantially rectangular in cross section. The opposite side walls of this well contain a plurality of transversely aligned bearings 46 and 47 in which the spindles 48 of the individual cutters 49 are journalled. Between their bearings 46 and 47 the spindles 48 have pinions 50 fixed thereto, each of which meshes with one of the gears 41. Thus, all of the cutters 49 are driven from the single shaft 40, and as shown in Figure 12, it will be noted that the adjacent gears 41 are alternate in their rotational effect so that adjacent cutters revolve in opposite directions. Though not necessary this arrangement is preferable since it achieves a more balanced cutting action.

Figure 13:
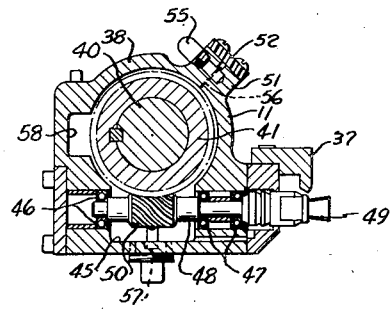
Figure 13 is a cross sectional view through Figure 12 on the plane of the line 13—13.
Figure 14:
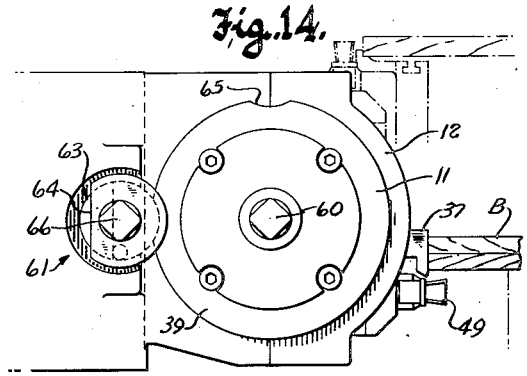
Figure 14 is a front end view of the cutter head shown in Figure 12, illustrating the cutters in whole lines in their tenon cutting positions and in broken lines in their mortise cutting positions.
Figure 15:
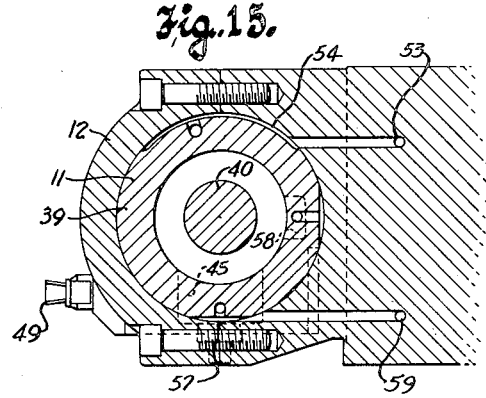
Figure 15 is a detail cross sectional view through Figure 12 on the plane of the line 15—15, said view being rotated to show the bottom of the cutter head at the bottom of the view.

Adequate lubrication for the cutter spindles and their gears is obtained by force feeding aerated lubricant into a manifold 51 extending lengthwise of the body 38 and formed jointly by a longitudinally extending groove therein and a cover plate 52. Any suitable means may be employed for bringing the lubricant into the manifold 51 and in the construction illustrated especially in Figures 12, 13 and 15, an inlet port 53 opening through one of the bearings 12 debouches into an arcuate passage 54 formed by a groove in the adjacent cylindrical end 39 of the cutter head body and the bearing surface in which it turns. A tube 55 and a hole opening to the bottom of the passage connects the passage with the opposite end of the manifold. Attention is directed to the fact that the arcuate passage 54 enables introduction of the aerated lubricant in either position of adjustment of the cutter head, that is, in its mortise cutting position as well as its tenon cutting position.

From the manifold 51 the lubricant is fed into the gear chamber and onto the gears through a series of discharge ports 56. The excess lubricant accumulates in a sump 57 when the cutter head is in its tenon cutting position and in a sump 58 when the cutter head is turned to its mortise cutting position. In either case the lubricant accumulating in the sump is withdrawn therefrom by suction through a discharge port 59.

Rotational adjustment of the cutter head from one position to the other is effected by a crank handle (not shown) applied to a square shaft 60 projecting from the front end of the cutter head body, but such adjustment is possible only when a lock 61 is released. The lock 61 comprises a stud 62 fixed to the front bearing 12 and upon which a locking member 63 is freely rotatable. This locking member is cylindrical except for being slabbed off as at 64, and in locking position its cylindrical side snugly engages in an arcuate notch 65 in the outer flange of the cutter head body. Two such notches 65 are provided ninety degrees apart, one for each of the positions of the cutter head.

A nut 66 threaded on the outer end of the stud 62 serves to hold the locking member in its locking position, but upon release of the nut the locking member may be rotated to align its slabbed off side 64 with the flange of the cutter head body in which the notches 65 are located to thus free the cutter head for rotation.

The mechanism for imparting the required cutter head motions

As indicated hereinbefore the cutter heads effect mortise cutting by horizontal reciprocation toward and from each other to thus carry the individual cutters into the ends of the work the required distance, and to effect tenon cutting the cutter heads are moved with an orbital motion with the orbits lying on parallel vertical planes.

The way in which these motions are imparted to the cutter heads is unique and constitutes one of the main features of this invention. Thus, the bearings 12 in which the cutter heads are journaled are mounted on and are part of carriage heads 67 which comprise the tops of the machine units 10. Each head 67 is mounted on a carriage 68 in a manner providing for horizontal reciprocation of the head with respect to the carriage along two right angularly disposed axes one of which is parallel to the longitudinal axis of the cutter head and the other normal thereto. It is the latter reciprocation of the carriage head 67 which produces the in and out mortise cutting movement of the cutter heads, and a combination of the other horizontal reciprocation of the carriage head and vertical movement of the carriage effects the orbital tenon cutting movement of the cutter heads.

Vertical movement of the carriage is produced by rotation of a drum type cam 69 in coaction with a stationarily mounted cam follower 70. The cam 69 is fixed to a vertical cam shaft 71 which is connected with the carriage 68 in a manner restraining the shaft and carriage against relative vertical displacement while allowing the shaft to rotate freely. The manner in which this connection between the shaft and the carriage is effected will be described hereinafter.

Also fixed to the shaft 71 is a disc type cam 72. Through a cam follower 73 riding this cam and connected with the carriage head 67 rotation of the cam 72 imparts horizontal reciprocation to the carriage head across the top of the carriage in a direction parallel to the longitudinal axis of the cutter head. Thus, rotation of the cams 69 and 72 in unison imparts orbital motion to the carriage head and consequently the cutter head mounted thereon.

Horizontal mortise cutting reciprocation of the carriage head along the other axis, that is, the axis which is normal to the longitudinal axis of the cutter head, is effected by a second disc type cam 74 and a cam follower 75 riding the cam and connected to the carriage head in a manner to translate rotation of the cam 74 into horizontal reciprocation of the carriage. The cam 74 is freely rotatable about the shaft 71 but as shown in Figure 4 is constrained to move vertically with the shaft 71 and the cams 69 and 72 fixed thereon.

Rotation is selectively imparted either to the cam 74 or the connected cams 69 and 72 by means of a transmission mechanism indicated generally by the numeral 76. This transmission mechanism comprises a power take-off shaft 77 journalled in the lower portion of the base 16 of the machine unit and at all times drivingly connected with a main drive shaft 78 through spiral gearing 79 and selectively drivingly connectible with either of two vertical pinion shafts 80 and 81. The shaft 80 has a pinion 82 fixed on its upper end which meshes with a gear 83 fixed to the cam 74. The shaft 81 has a pinion 84 fixed on its upper end which meshes with a gear 85 fixed to the underside of the drum type cam 69.

At its lower end the shaft 80 has a pinion 86 fixed thereto while the shaft 81 has a pinion 87 similarly located. These pinions mesh respectively with elongated idler gears 88 and 89, the former of which is connected through a pinion 90 and bevel gearing 91 with a jack shaft 92 journalled in the lower portion of the base 16 alongside the shaft 77, while the latter idler gear 89 is connected through a pinion 93 and bevel gearing 94 with a jack shaft 95 also journalled in the lower portion of the base 16 at the opposite side of the shaft 77.

The jack shafts 92 and 95 have gears 96 and 97 fixed thereto with which a pinion 98 slidably splined on the shaft 77 may be selectively meshed. The pinion 98 is manually shiftable between either of its two operative positions by means of a shifter fork 99 fixed to a shifter rod 100 which protrudes from the front of the base 16 and has a knob 101 fixed thereon. Conventional detent means 102 are provided to hold the shifter mechanism in neutral or either of its two operative positions.

When the transmission mechanism is set to effect mortise cutting movement of the cutter head the shiftable pinion 98 is in mesh with the gear 96 so that the drive from the main drive shaft 78 is through the power take-off shaft 77, the jack shaft 92 and the vertical shaft 80 which is at all times drivingly connected to the gear 83 fixed to the underside of the cam 74; and when the pinion 98 is shifted into mesh with the gear 97 the drive from the main drive shaft extends through the power take-off shaft 77, the jack shaft 95 and the vertical shaft 81 to the gear 85 which is fixed to the underside of the drum type cam 69 to impart orbital tenon cutting motion to the cutter head.

With the pinion 98 in its neutral position either of the jack shafts 92 or 95 may be manually turned to manually carry the cutter head through its two motions to facilitate setting up the machine, and for this purpose the front ends of the jack shafts have square projections to receive hand cranks (not shown), the squared projections protruding through a cover plate 103 on the lower portion of the base 16. The plate 103 covers a chain drive 104 through which rotation may be imparted manually to a pinion 105 which meshes with a rack 106 fixed to the bed of the main frame. The chain drive includes a manually rotatable sprocket 107 fixed upon a shaft having a squared end protruding from the cover plate 103 to receive a hand crank (not shown), and as will be readily apparent rotation of the pinion 105 by the chain drive moves the machine unit along the bed of the main frame.

*The drive for the two machine units*

The mounting of the bases 16 of the machine units upon the bed 6 of the main frame follows conventional machine practice, and the maintenance of the driving connection between the main drive shaft 78 and the power take-off shafts 77 of the two machine units without interfering with adjustment of the machine units along the bed involves merely the utilization of a gear box 108 mounted on the back of each base 16 to house and hold the miter gears 79 in mesh.

The main drive shaft 78 receives support from bearings (not shown) carried by the gear boxes 108 and is also journalled in bearings 109 carried by the main frame. The shaft extends for substantially the full length of the bed 6 and projects beyond the upright pedestals 7 and 8. The end of the shaft adjacent to the pedestal 7 is drivingly connected through gearing 110 with a pulley shaft 111 journalled in suitable bearings carried by the main frame, and a pulley 112 of fixed diameter mounted on the shaft 111 is driven from the main drive motor 113 through a variable speed transmission 114. Hence, the speed at which the main drive shaft 78 and consequently the mechanism within the two machine units is driven is readily adjusted.

The opposite end of the main drive shaft is drivingly connected through gears 115 with a timing cam shaft 116 to be hereinafter more fully described.

*The construction of the machine units*

Each carriage 68 is guided for vertical movement upon its base 16 by vertical ball-bearing type slideways 117 mounted on the adjacent walls of the base 16 and carriage 68 which face the center of the machine (see Figure 5). The weight of the carriage 68 and all structure mounted thereon is levitated by a pair of springs 118 interposed between a spider-like plate 120 which is fixed with respect to the carriage and supporting pads 122 fixed in the bottom of the base. To support the springs against buckling they are contained within tubes 119 fixed to the underside of the plate 120 and preferably cylindrical blocks 121 slidable in the tubes 119 are interposed between the lower ends of the springs and the pads 122.

The spider-like plate 120 is fixed with respect to the carriage 68 through the cam shaft 71 and the vertical shafts 80 and 81. For this purpose a bearing 123 fixed in the plate 120 mounts the lower end of the shaft 71 in a manner enabling upward transmission of thrust from the plate 120 to the shaft and bearings 124 between the upper end of the shaft 71 and an upstanding central boss 125 on the top of the carriage 68 provide for upward transmission of thrust from the shaft to the carriage 68. In a similar manner the bearings 126 and 127 carried respectively by the plate 120 and the top wall of the carriage 68 coact with the shafts 80 and 81 to transmit upward thrust from the plate 120 to the carriage. It is, of course, to be understood that the shafts 71, 80 and 81 are appropriately stepped to effect this desired result.

The mounting of the carriage head 67 on the carriage in a manner allowing the former to reciprocate horizontally along either of two right angularly disposed axes includes a hollow rectangular frame 130 interposed between the top wall 129 of the carriage and what may be considered the bottom wall 129′ of the carriage head. The frame 130 is entirely separate from the carriage and the carriage head and embraces the central hollow boss 125 with sufficient clearance to allow substantial horizontal movement of the frame in all directions.

A set of anti-friction slideways 128 having their track sections fixed to the undersides of the two opposite side rails of the frame 130 and the top wall 129 of the carriage mount the frame 130 for horizontal reciprocation along an axis normal to the longitudinal axis of the cutter head. This motion is produced by the cam 74 and to this end the cam follower 75 is fixed to one of the two end rails of the frame 130 by a bracket 131.

This same end rail and the adjacent portion of the bottom wall 129' of the carriage head have the track sections of a second set of anti-friction slideways 132 fixed thereto so that while the carriage head is constrained to move with the frame 130 it is also movable with respect thereto in the direction parallel to the longitudinal axis of the cutter head.

To produce this latter motion of the carriage head in consequence to rotation of the cam 72 and without interfering with movement of the carriage head in unison with the frame 130, the cam follower 73 is fixed to a slide bar 133 guided for longitudinal motion diametrically across the cam by bearings 134 carried by the rim of a stationary cup-shaped housing 135 in which the cam 72 turns. One end of the slide bar 133 has a roller 136 mounted at its underside and this roller engages in a track 137 fixed to the carriage head and disposed at right angles to the slide bar 133. Thus, as the slide bar is reciprocated by rotation of the cam 72 it draws the carriage head with it.

Since the support provided for the carriage head by the anti-friction slideways 132 is not centered additional support is provided for the carriage head in the form of a thrust bearing 132' between the bottom wall 129' of the carriage head and the frame 130.

It is to be observed that the drive motor 44 for the cutters is mounted upon the carriage head and is at all times drivingly connected to the gear shaft 40 of the cutter head, regardless of the position of adjustment of the cutter head.

*Vertical adjustment of cutter head for mortising at different elevations*

In order for the cam follower 70 which tracks in the drum type cam 69 to effect up and down motion of the cam and carriage in response to rotation of the cam for the production of the orbital cutter head motion, the follower must, of course, be restrained against vertical displacement. Normally this is the case. However, vertical adjustment of the cam follower 70 provides means for determining the elevation at which the cutter head operates. Such adjustment is necessary to adapt the machine to the cutting of mortises on the ends of so-called "half swell" or "half serpentine" drawer fronts, a situation illustrated diagrammatically in Figure 18. To this end the cam follower 70 is carried by a member 138 which constitutes essentially a nut threaded on a vertical adjusting screw 139 (see Figures 3 and 5).

The nut member 138 is guided for vertical motion and restrained against rotation about the screw 139 by slideways 140 on the wall of the base 16 which also carries the stationary track sections of the slideways 117. The upper end of the screw 139 is journalled in a bearing 141 on the base 16 and the screw is restrained against shifting endwise by collars fixed to the screw and engaging the top and bottom of the bearing 141. The extreme upper end of the screw shaft is squared as shown in Figure 3 and aligns with a hole in the top of the carriage head normally closed by a hinged cover 142. Opening this cover permits the insertion of a suitable wrench into the machine unit and its application to the end of the screw.

Vertical movement of the carriage whether it is produced by adjustment of the nut member 138 or by rotation of the drum cam 69 in coaction with its follower 70, of course, raises and lowers the pinions 86 and 87. It is for this reason that the idler gears 88 and 89 are elongated for otherwise such vertical movement of the carriage would result in disengagement of the transmission.

*Interlocking latches*

Since it is only for mortising that adjustment of the elevation of the cutter head may be necessary, latch means are provided to prevent such vertical adjustment of the carriage when the transmission mechanism controlled by the knob 101 is in its tenon cutting condition. This latch means comprises a hook 143 pivoted to the nut member 138 and yieldingly urged in a direction to engage under a keeper 144 fixed to the adjacent wall of the base 16. The hook 143 has an arm extending upwardly beyond its pivot to lie in the path of one end of a bell crank lever 145 pivotally mounted upon a horizontal wall section 146 of the base 16 to swing about a vertical axis. The other end of this bell crank lever lies in the path of the inner end of the shifter rod 100 and the parts are so proportioned that as long as the shifter rod 100 is in its neutral position the bell crank lever 145 bearing against the upwardly projecting arm of the hook 143 holds the hook disengaged from its keeper 144. This condition of the latch, of course, also obtains when the shifter rod 100 is pushed in to set the transmission mechanism for mortise cutting.

Consequently, as long as the transmission mechanism is either in neutral or in mortise cutting condition it is possible to effect vertical adjustment of the carriage by means of the screw 139. However, when the shifter rod 100 is pulled out to set the transmission mechanism for tenon cutting, the bell crank lever 145 no longer restrains the hook 143 against spring propelled movement and consequently the hook engages under the keeper 144. Obviously with such engagement it is impossible to raise the nut member 138 from its normal lowered position, in which position the nut member is maintained for all tenon cutting.

Latch means are also provided for preventing the shifting of the transmission mechanism to tenon cutting condition whenever the nut member 138 has been raised from its normal lowered position which, as just described, is possible only when the transmission mechanism is either in neutral or mortise cutting condition.

This second latch means comprises a pivoted dog 147 spring urged to engage behind a shoulder 148 on the hub of the shifter fork 99 when the shifter fork has been pushed in to set the transmission mechanism for mortise cutting. As long as the nut member 138 and consequently the carriage is in its normal lowered position this dog is restrained against spring urged engagement behind the shoulder 148 by virtue of the engagement of an abutment 149 on the spider-like plate 120 with a lever 150 extending from the dog. Upon elevation of the nut member 138 and consequently the spider-like plate 120, the abutment 149 is lifted to thus allow the dog 147 to be drawn down into locking engagement with the shoulder 148 and such engagement prevents outward movement of the shifter rod 100.

*Feed table and ejector*

To achieve maximum production a novel feed table indicated generally by the numeral 151 and a novel ejector mechanism 152 are provided (see Figure 16). The feed table comprises actually only a pair of arms 153 fixed to a shaft journalled in bearings 154 carried by brackets 155 secured to the work supports 13—14. A spring 156 connected to the shaft biases it in the direction to swing the arms 153 to an upwardly inclined work receiving position in which position the operator may readily place a board B on the arms with its lower edge resting upon adjustably mounted stops 157.

When the arms are swung down as shown in dotted lines in Figure 16, they align with the tops of the work supports to enable the board B to slide into position against the stops 35.

The ejector mechanism 152 comprises a pair of pushers 158 each slidable along a guide track 159 fixed to the inner face of each work support in position. These pushers are connected by links 160 with the upper ends of pivoted arms 161 arranged to swing in unison about the axis of a square shaft 162 to which they are slidably secured. The shaft 162 is journalled in bearings supported by brackets 163 fixed to part of the main frame.

Another set of bearings carried at the outer ends of bracket arms 164 fixed to the bases 16 of the machine units so engages the mounted ends of the arms 161 as to shift the same along the shaft 162 whenever the position of the machine units on the bed 6 is changed. In this manner the arms 161 are always properly aligned with the work supports.

Rocking movement is imparted to the shaft 162 and hence the arms 161 by an air cylinder 165, the piston of which is connected as at 166 to a lever 167 fixed to the shaft 162 at a point beyond the range of adjustment of the arms 161. The distance between the axis of the shaft 162 and the connection 166 is adjustable by a manually operable screw 168 and obviously with such adjustment the arc through which the arms 161 are swung in response to the stroke of the air cylinder may be changed. In this manner the ejector mechanism is adjusted for different width boards.

The location of the range of movement of the pushers 158 is adjustable by sliding the air cylinder 165 forward or backward and to this end a screw type adjustment 169 is provided. In setting the ejector mechanism the adjustment 169 is actuated to bring the pushers 158 just rearwardly of the stops 35 when the pushers are retracted.

When the ejector operates, its pushers 158 rapidly shove the board off the work supports and onto a pair of depending hooked arms 170 fixed to the front ends of the work supports.

The drill heads

During the mortising of drawer fronts it is also desirable to simultaneously drill the same for reception of the handles or other hardware and to this end drill heads indicated generally by the numeral 171 are provided. These drill heads are mounted upon the bridge 9 for adjustment lengthwise thereof and are equipped with the customary drill chucks and drive motors therefor. Air cylinders 172 are provided to project the drills downwardly through the work whenever the cylinders are energized. The mounting of the drill heads upon the bridge 9 is similar to the mounting of the hold-downs except that the rack and pinion for effecting adjustment of the drill heads along the bridge is at the top of the bridge rather than at the bottom.

Attention is directed to the fact that the drill heads, like the hold-downs, are also arranged to swing about horizontal axes to thus enable proper disposition of the drills for drilling through serpentine drawer fronts as indicated, for instance, in Figure 18 which, however, shows only a "half-swell" or "half serpentine" drawer front being acted upon. It is, of course, also possible to move the drill heads entirely out of the way when the work being done does not require the drilling of holes therethrough.

Synchronism

Since it is one of the objectives of this invention to maintain absolute synchronism between the functioning of the cutter heads of the two machine units and also to maintain synchronism between the cutter heads, the hold-downs, the drill heads and the ejector mechanism, the actuation of the drive mechanism for producing the various motions of the cutter heads of both machine units is from the one common main shaft and in addition the timing of the control instrumentalities governing operation of the hold-downs, the drill heads and the ejector mechanism is driven from this same main shaft. This is diagrammatically illustrated in Figure 9 which shows the main drive shaft driving the power takeoff shafts of both machine units and in addition driving a timing cam shaft 116 through gearing 115. The cam shaft 116 has three cams 173, 174 and 175 fixed thereon to turn in unison.

Each cam controls a micro switch as indicated and these switches in turn control the energization of solenoids (not shown) by which the valves governing operation of the air cylinders of the hold-downs, drill heads and ejector mechanism are controlled. The timing of these three units as governed by the rotational disposition of the cams with respect to one another, is such that the hold-downs are first actuated and directly thereafter substantially concomitantly therewith the drill heads (if they are being used) are caused to descend, and then as soon as the drill heads are raised and the hold-downs released, the ejector mechanism functions.

The timing of these three functions with respect to one another is pre-set and remains fixed but the timing thereof with respect to the functioning of the cutter heads is readily adjustable. Such adjustment is necessary since in changing from mortising to tenoning and vice versa the relationship between the transmission mechanisms of the two machine units and the main shaft undoubtedly will be altered. To provide the adjustment the gearing 115 includes a gear 176 which is frictionally clutched to a hub fixed to the shaft 116 by tightening a nut 177. Upon loosening the nut the hub and shaft 116 and consequently the cams fixed thereon may be turned with respect to the gear 176 for resetting the cams to cause the operations controlled thereby to take place at the proper times in the cycle.

Operation

In the operation of the machine it is, of course, desirable to do all of the tenon cutting of the drawer sides for a particular run of work and then adjust the machine for the mortise cutting of all of the drawer backs and drawer fronts.

For tenon cutting the operator first makes certain that the two cutter heads 11 are in their tenon cutting positions of adjustment in which the axes of their cutters are horizontal. In these positions the end stops 37 of the two cutter heads face each other. The operator then adjusts the positions of the machine units 10 so that the space between the facing end stops 37 just snugly accommodates the length of the drawer sides to be machined.

With the gear shifter knobs 101 in neutral the operator then manually synchronizes the two machine units, i. e. brings their cutter heads to the same position, preferably the start of the orbital tenon cutting motion. Both knobs are now pulled out to shift the transmission mechanisms into tenon cutting condition.

The low work supports 14, if not already in position, are then secured to the post structures 15 which are adjusted, if necessary, to bring the top of the work supports 14 into proper position depending upon the thickness of the stock. The ejector mechanism is then lined up and adjusted as required and in addition the hold-downs are adjusted along the bridge 9 to positions above the work supports. The timing of the hold-down and ejector mechanism operation is then checked and readjustment thereof, if necessary, is effected to make certain that the hold-downs grip the work before the cutter heads begin their cutting operation, it being understood that at the start of the cycle the cutters lie beneath the work.

With these adjustments made the operator starts the machine, places a pair of drawer sides in superimposed relation upon the feed table, and when the hold-downs rise swings the feed table down and slides the superimposed drawer sides into position.

As the cycle of the machine begins the hold-downs first come down and grip the work and thereafter the transmission mechanisms within the machine units operate to impart orbital motion simultaneously to both the cutter heads. During this orbital motion of the cutter heads the individual cutters first move up through the end portions of the work, swing around in an arc and then move down through the work, swing around and come back down to their starting positions. This done, the hold-downs automatically rise and directly thereafter the ejector mechanism shoves the work off the supports 14 and onto the receiving table 170.

For mortise cutting the cutter heads are rotated to dispose their cutter axes vertically and the work supports 14 are replaced by the taller work supports 13. The spacing between the two machine units is then readjusted so that the space between the end stops 36 just snugly receives the length of the drawer backs or fronts, whichever is to be mortised. The knobs 101 are then pushed in to set the transmisson mechanisms for mortise cutting.

During the shifting of the transmission mechanisms from tenon cutting to mortise cutting it is quite likely that the timing between the cutter heads and the hold-downs will be disturbed, which will necessitate retiming the cams which control the operation of the hold-downs, the drill heads and the ejector mechanism. If it is the drawer fronts that are being mortised the drill heads are swung into position and properly adjusted, and thereafter the sequence of operations is similar to that described, except that in the cutting of the mortises the cutter heads merely move horizontally toward and from each other to carry the individual cutters into the ends of the stock the required distance.

From the foregoing description taken in connection with the accompanying drawings, it will be readily apparent to those skilled in the art that this invention provides an automatic mortising and tenoning machine especially well adapted for high speed operation, and that by virtue of the novel manner in which the transmission mechanism of the two machine units functions and produces the required movements of the cutter heads an exceptionally smooth running, vibrationless machine is obtained.

It will also be apparent that absolute synchronism between all of the various machine functions is positively achieved by virtue of the fact that one main drive shaft controls and effects all operations, and that this synchronism obtains regardles of the speed at which the machine is being operated. It will also be seen that the operation and setting up of the machine to different work is extremely simple, particularly because of the novel manner in which changeover from mortise cutting to tenon cutting and vice versa is accomplished.

Many other advantages of the machine of this invention will be evident to those skilled in the art, particularly from a comparison thereof with the aforesaid Patent No. 2,586,798.

What I claim as my invention is:

1. In an automatic mortising and tenoning machine: an elongated cutter head having a row of side-by-side power driven cutters constrained to rotate on parallel axes normal to the longitudinal axis of the cutter head; a carrier for the cutter head; means mounting the cutter head in bearings at one end of the carrier and adjustably holding the cutter head in either a mortise cutting position at which the common plane containing the cutter axes is upright, with the cutters facing upward, or a tenon cutting position in which the common plane containing the cutter axes is horizontal and the cutters face outwardly from said end of the carrier, and in both of which positions the cutter head is constrained to move with the carrier; means mounting the carrier for vertical reciprocation and for horizontal movement along two right angularly disposed axes, one of which is parallel to the longitudinal axis of the cutter head; motion imparting means for imparting to the carrier only vertical reciprocation between defined limits; motion imparting means for imparting to the carrier only horizontal back and forth motion between defined limits in the direction parallel to the longitudinal axis of the cutter head; synchronizing means constraining said two motion imparting means to move in timed relation so that they cooperate in imposing upon the carrier a resultant orbital tenon cutting motion; an instrumentality for imparting only horizontal back and forth movement to the carrier along an axis normal to the longitudinal axis of the cutter head to impart in and out mortise cutting movement to the carrier; a driver; and means for selectively connecting with said driver either said two motion imparting means or said last-named instrumentality.

2. In an automatic mortising and tenoning machine: an elongated cutter head having a row of side-by-side power driven cutters constrained to rotate on parallel axes normal to the longitudinal axis of cutter head; a carrier for the cutter head; means mounting the cutter head in bearings at one end of the carrier and adjustably holding the cutter head in either a mortise cutting position at which the common plane containing the cutter axes is upright, with the cutters facing upward, or a tenon cutting position in which the common plane containing the cutter axes is horizontal and the cutters face outwardly from said end of the carrier, and in both of which positions the cutter head is constrained to move with the carrier; means including three sets of elongated guide means disposed mutually perpendicular to one another mounting the carrier for vertical reciprocation and for horizontal movement along two right angularly disposed axes, one of which is parallel to the longitudinal axis of the cutter head; three sets of motion imparting means, for imparting to the carrier reciprocatory motion between defined limits along each of said mutually perpendicular guide means; synchronizing means for coordinating the motion imparting means which impart vertical reciprocation to the carrier and which impart reciprocation along said horizontal axis parallel to the longitudinal axis of the cutter head, to thereby impose upon the carrier a resultant orbital tenon cutting motion; a driver; and means for selectively connecting with the driver either said two synchronized motion imparting means, for tenon cutting motion of the carrier, or the third motion imparting means, for horizontal mortise cutting reciprocation of the carrier transversely to the longitudinal axis of the cutter head.

3. In an automatic mortising and tenoning machine: a base; a vertically reciprocable carriage; means mounting the carriage on the base and constraining it to vertical reciprocation; a head for the carriage; means mounting the carriage head on the carriage for horizontal movement of the carriage head with respect to the carriage along two axes disposed at right angles to one another; an elongated cutter head having a row of side-by-side cutters constrained to rotate on parallel axes normal to the longitudinal axis of the cutter head and lying in a common plane parallel to but spaced from the longitudinal axis of the cutter head; axially aligned spaced apart bearings on the carriage head in which the cutter head is journalled for bodily rotary adjustment about its longitudinal axis, the common axis of said bearings being parallel to one of said two axes along which the carriage head is horizontally movable, the rotary adjustment of the cutter head providing for movement thereof between a mortise cutting position in which the cutters face upward and the common plane containing the cutter axes is vertical, and a tenon cutting position at which the common plane containing the cutter axes is horizontal and the cutters face out from the carriage head; power means mounted on the carriage head at all times drivingly connected with the cutters; instrumentalities for effecting simultaneous vertical reciprocation of the carriage and horizontal back and forth movement of the carriage head along the horizontal axis which is parallel to the common axis of the bearings in which the cutter head is journalled, said instrumentalities comprising a motion translating means for imparting only such vertical reciprocation to the carriage, a motion translating means for imparting only such horizontal motion to the carriage, and means synchronizing said two motion translating means to cause them to cooperate to impart orbital tenon cutting motion to the cutter head; instrumentalities for effecting only horizontal back and forth movement of the carriage head along an axis normal to the longitudinal axis of the cutter head to thereby impart in and out mortise cutting movement to the cutter head; power means for effecting operation of said two instrumentalities; and means for selectively connecting one or the other of said instrumentalities with the power means.

4. The machine of claim 3 wherein said two instrumentalities are mechanical, the power means for effecting operation thereof is a driven shaft, and the means for selectively rendering one or the other instrumentalities operative comprises a gear shift.

5. In an automatic mortising and tenoning machine: a main frame; right and left hand machine units mounted on the main frame for movement of one of said units toward and from the other; each of said machine units including a work support for supporting one end of a board to be acted upon; each of said machine units including an elongated cutter head having a gang of side-by-side cutters constrained to rotate on parallel axes lying in a common plane parallel to the longitudinal axis of the cutter head; each of said machine units including structure mounting its cutter head for horizontal movement toward and from the cutter head on the other machine unit with the longitudinal axes of the cutter heads at all times parallel to one another, and for vertical reciprocation and horizontal movement along an axis parallel to the longitudinal axes of the cutter heads so that by combining the vertical reciprocation and said last named horizontal movement the cutter heads have orbital motion imparted thereto upon vertical planes; a main drive shaft common to both machine units; a power take-off shaft in each machine unit; means at all times drivingly connecting said power take-off shafts to said main drive shaft including a part slidably splined to the main drive shaft so that the distance between machine units may be adjusted without disrupting said driving connections; and manually shiftable transmission mechanism in each machine unit for translating rotation of its power take-off shaft either into horizontal movement of the structure mounting its cutter head along an axis normal to the longitudinal axis of the cutter head to thus effect simultaneous movement of the cutter heads toward and from each other, or into simultaneous vertical reciprocation and horizontal movement of the structure mounting its cutter head along the axis parallel to the longitudinal axis of the cutter head to thus effect simultaneous orbital movement of both cutter heads.

6. In an automatic mortising and tenoning machine: a main frame; right and left hand machine units mounted on the main frame for movement of one of said units toward and from the other; each of said machine units including work supporting means for supporting one end of a board to be acted upon in proper position either for mortise cutting or for tenon cutting; each of said machine units including a cutter head mounted for adjustment between a mortise cutting position and a tenon cutting position; a hold-down for each machine unit cooperable with the work supporting means; each of said machine units including structure mounting its cutter head for horizontal movement toward and from the cutter head on the other machine unit to effect mortise cutting and for orbital tenon cutting movement on a vertical plane; a main drive shaft common to both machine units; a power take-off shaft in each machine unit; means at all times drivingly connecting said power take-off shafts to said main drive shaft including a part slidably splined to the main drive shaft so that the distance between the machine units may be adjusted without disrupting said driving connections; manually shiftable transmission mechanism in each machine unit for translating rotation of its power take-off shaft either into horizontal movement of the structure mounting its cutter head to effect simultaneous mortise cutting motion of both cutter heads, or into simultaneous vertical reciprocation and horizontal movement of the structure mounting its cutter head to effect simultaneous orbital tenon cutting motion of both cutter heads; power means for actuating the hold-downs; and control instrumentalities governing said power means, said control instrumentalities being driven by the main drive shaft so that the operation of both hold-downs is properly timed with the functioning of the cutter heads.

7. The machine set forth in claim 6 further characterized by the provision of automatic ejector mechanism for ejecting boards from the work supporting means after release of the hold-downs; power means for actuating the ejector mechanism; and control instrumentalities for said ejector mechanism actuating power means driven from the main drive shaft so that the functioning of the ejector mechanism is properly timed with the operation of the hold-downs and the functioning of the cutter heads.

8. The machine set forth in claim 7 further characterized by the face that said two control instrumentalities include timing cams driven by the main drive shaft and fixed with respect to each other so that the timing of the hold-downs and ejector mechanism is at all times properly coordinated; and means for adjusting said timing cams rotationally with respect to the main drive shaft so that the operation of the hold-downs and ejector mechanism may be properly timed with the functioning of the cutter heads.

9. The machine set forth in claim 6 further characterized by the fact that said control instrumentalities include a timing cam driven by the main drive shaft; and means for adjusting the timing cam rotationally with respect to the main drive shaft so that the operation of the hold-downs may be properly timed with the functioning of the cutter heads.

10. In a machine having a part mounted for orbital motion in a vertical plane and for horizontal reciprocation along an axis normal to said plane, means for imparting either the orbital motion or the horizontal reciprocation to said machine part, comprising: a vertical shaft; a connection between said shaft and the machine part to be actuated constraining said elements to move vertically in unison while the shaft is free to turn with respect to the machine part; a drum type cam fixed to the shaft; a stationary cam follower engaging said cam so that upon rotation of the shaft vertical reciprocation is imparted to it and the machine part; a disc type cam fixed to the shaft; a cam follower connected to the machine part and riding said disc type cam to impart horizontal reciprocation to the machine part along an axis parallel with the vertical plane of the orbital motion, which horizontal reciprocation along with the vertical reciprocation of the machine part produces the orbital motion; a second disc type cam freely rotatable upon the shaft; a cam follower connected to the machine part and riding said second disc type cam to translate rotation of said cam into horizontal reciprocation of the machine part along an axis normal to said first mentioned horizontal axis and the plane of orbital motion; and means for selectively turning the shaft or the second disc type cam.

11. In a machine having a part mounted for orbital motion in a vertical plane and for horizontal reciprocation along an axis normal to said plane, means for imparting either the orbital motion or the horizontal reciprocation to said machine part, comprising: a drum type cam; a disc type cam; means fixedly connecting said cams to one another so that they turn in unison; means mounting the connected cams on the machine for rotation about a vertical axis and for bodily up and down movement; a connection between said connected cams and the machine part to be moved through which the connected cams and machine part are constrained to vertical reciprocation in unison without interfering with the freedom of the connected cams to rotate; a stationary cam follower engaging the drum type cam so that rotation of the connected cams imparts vertical reciprocation to them and the machine part; a cam follower connected to the machine part and riding the disc type cam and through which rotation of the connected cams is translated into horizontal reciprocation of the machine part along a fixed horizontal axis which horizontal reciprocation along with the vertical reciprocation produces the orbital motion of the machine part; a second disc type cam constrained to rotation about a vertical axis; a cam follower connected to the machine part and riding said second disc type cam for translating rotation of said second disc type cam into horizontal reciprocation of the machine part along an axis normal to the first designated horizontal axis and the plane of the orbital motion; and means of selectively turning either the connected cams or the second designated disc type cam.

12. The structure set forth in claim 11 further characterized by the provision of a vertically adjustable mounting for the stationary cam follower which engages the drum type cam, vertical adjustment of said cam follower establishing the elevation at which the machine part operates; and means for raising and lowering said mounting of the cam follower.

13. The structure set forth in claim 10 further characterized by the fact that the means for selectively turning the shaft or the second disc type cam comprises a driven gear at all times drivingly connected to the shaft; a driven gear at all times drivingly connected to the second disc type cam; and a driving gear slidably mounted for selective driving engagement with either of said driven gears.

14. The structure set forth in claim 11 further characterized by the fact that the means for selectively turning the connected cams or the second disc type cam comprises a driven gear at all times drivingly connected to the connected cams; a driven gear at all times drivingly connected to the second disc type cam; and a driving gear slidably mounted for selective driving engagement with either of said driven gears.

15. The structure set forth in claim 10 further characterized by the provision of spring means acting upon and levitating the machine part, the shaft and the cams.

16. The structure set forth in claim 11 further characterized by the provision of spring means acting upon and levitating the machine part and the cams.

17. In an automatic mortising and tenoning machine: an elongated cutter head having a gang of cutters arranged in a row and rotating on parallel axes lying in a common plane parallel to the longitudinal axis of the cutter head; mounting means for the cutter head including bearings in which the cutter head is journalled for bodily adjustment between a mortise cutting position at which the cutter axes are upright and a tenon cutting position at which the cutter axes lie in a horizontal plane; means for imparting to the cutter head either orbital motion in a vertical plane normal to the axes of the cutters when the cutter head is in its tenon cutting position or horizontal reciprocation in a direction normal to the vertical plane of the orbital motion and to the common plane containing all the cutter axes when the cutter head is in its mortise cutting position, said means comprising a carriage guided for vertical movement; a carriage head mounted upon the carriage and guided for horizontal reciprocation with respect to the carriage along the two required axes of horizontal reciprocation of the cutter head, the bearings in which the cutter head is journalled being fixed on the carriage head; a drum type cam and a disc type cam fixed with respect to one another and constrained to rotation about and up and down movement along a vertical axis; a connection between the carriage and said cams constraining the carriage to partake of any up and down motion of the cams; a stationary cam follower engaging the drum type cam so that upon rotation of the cams they and the carriage move up and down; a cam follower connected with the carriage head and riding the disc type cam to translate rotation of the cam into horizontal reciprocation of the carriage head along an axis parallel to the longitudinal axis of the cutter head which horizontal reciprocation together with the vertical reciprocation of the carriage produces the orbital motion; a second disc type cam constrained to rotation about a vertical axis; a cam follower connected with the carriage head and riding said second disc type cam to translate rotation of the cam into horizontal reciprocation of the carriage head along an axis normal to the plane of the orbital motion; and means for selectively turning either the connected cams or the second disc type cam.

18. In an automatic mortising and tenoning machine, the combination set forth in claim 17 further characterized by the provision of spring means reacting between the carriage and a fixed support to levitate the carriage and all the structure movable vertically therewith.

19. In an automatic mortising and tenoning machine, the combination set forth in claim 17 further characterized by the provision of a vertically adjustable mounting for the stationary cam follower which engages the drum type cam; and means for vertically adjusting said mounting to thereby establish the elevation at which the carriage head operates.

20. In an automatic mortising and tenoning machine, the combination set forth in claim 19 further characterized by the provision of latch means interconnected between the vertically adjustable mounting of the stationary cam follower and the means for selectively turning either the connected cams or the second disc type cam for restraining the mounting for the stationary cam against upward adjustment as long as the connected cams are operative.

21. In an automatic mortising and tenoning machine, the combination set forth in claim 20 further characterized by the provision of other latch means interconnected between a part which partakes of any vertical adjustment of the mounting for the stationary cam and the means for selectively turning either the connected cams or the second disc type cam for restraining said last named means against actuation from its condition rendering the second disc type cam operative whenever the mounting for the stationary cam has been raised from a predetermined normal position.

References Cited in the file of this patent
UNITED STATES PATENTS

| Number | Name | Date |
|---|---|---|
| 890,743 | Winberg | June 16, 1908 |
| 2,005,647 | Crouch | June 18, 1935 |
| 2,299,602 | Teague | Oct. 20, 1942 |
| 2,578,521 | Early | Dec. 11, 1951 |
| 2,586,798 | Eck | Feb. 26, 1952 |
| 2,606,581 | Weisner | Aug. 12, 1952 |